July 28, 1959 W. A. ELSTON ET AL 2,896,332
APPARATUS FOR DETECTING IRREGULARITIES IN SURFACES
Filed June 27, 1955 5 Sheets-Sheet 1

William A. Elston
Lorin A. McElwee
Jerry W. Moore, Jr.
William C. Tomerlin, Jr.
INVENTORS BY Vincent Martin
Joe E. Edwards
B. R. Pravel
ATTORNEYS July 28, 1959 W. A. ELSTON ET AL 2,896,332
APPARATUS FOR DETECTING IRREGULARITIES IN SURFACES
Filed June 27, 1955 5 Sheets-Sheet 2

William A. Elston
Lorin A. McElwee
Jerry W. Moore, Jr.
William C. Tomerlin, Jr.
INVENTORS BY Vincent Martin
Jos. E. Edwards
B. R. Pravel
ATTORNEYS

United States Patent Office 2,896,332
Patented July 28, 1959

2,896,332

APPARATUS FOR DETECTING IRREGULARITIES IN SURFACES

William A. Elston, Lorin A. McElwee, Jerry W. Moore, Jr., and William C. Tomerlin, Jr., Shreveport, La., assignors to United Gas Corporation, Shreveport, La., a corporation of Delaware Application June 27, 1955, Serial No. 518,002

22 Claims. (Cl. 33—178)

This invention relates to new and useful improvements in apparatus for detecting irregularities in surfaces and relates particularly to an apparatus for detecting and measuring irregularities and pits in wall surfaces such as the bores of conductors or pipes.

It is well known that the internal surface of fluid conductors, such as steel pipelines, well casing and well tubing, are subject to internal pitting due to the corrosive action of the fluids flowing therethrough. Such pitting takes the form of recesses or depressions, generally referred to as pits, and it is highly desirable to determine the actual depth and number of such pits, as well as the position thereof longitudinally of the pipe. Various devices for detecting and measuring internal pitting within pipes are available and one example of such device is that disclosed in the patent to Channey et al. No. 2,518,663; however, all prior devices have operated on the basic principle of calipering the internal size of the pipe, that is, employing the axis or axial center of the pipe as the base line from which measurements are made, with the result that accurate detection and measurement of internal pits is impossible where the pipe is slightly out of round.

In the case of larger pipe such as is used in pipe lines, the presently available devices which operate on the calipering principle are not satisfactory because the device must ordinarily be moved through the pipe line along a horizontal axis and it is substantially impossible to maintain the unit properly centered to provide accurate measurement. In pipes of relatively small diameter the accurate centering of the calipering device is not as important because the change in radius due to the out-of-roundness of the pipe is an acceptably small percentage of the depth of the pits.

It is one object of this invention to provide an improved corrosion detector which will accurately detect and measure irregularities such as raised portions or depressions as caused by internal pitting within a conductor and which is particularly adapted for use in detecting and measuring said irregularities in the larger fluid conductors such as are employed in gas pipelines.

An important object of the invention is to provide a detector apparatus which is so constructed that the detection and measurement are accomplished by utilizing the internal wall of the pipe as the reference line or base from which the measurement is made, whereby all of the disadvantages incident to employing the axis of the pipe as the reference line or base, as is the case in prior devices, are obviated.

A particular object is to provide an apparatus of the character described having a plurality of probing units which traverse the internal wall of the pipe as the apparatus is moved through the pipe under investigation; each probing unit including a reference element which engages the pipe wall and a detector element which is adapted to move into engagement with the irregularity, whereby the relative positions of the two elements are indicative of the presence of the irregularity in the wall of the pipe and are also a measure of the depth or extent of such irregularity.

Another object is to provide an apparatus of the character described wherein the detection and measurement of pits or recesses in the internal wall of the pipe are made entirely independently of the diameter and the cross-sectional shape of said pipe, whereby such factors of diameter and shape have no effect upon the operation of the apparatus and more accurate detection and measurement may be accomplished.

Still another object is to provide an improved pit detector apparatus having a plurality of probing units mounted thereon in a circumferential pattern whereby substantially the major portion of the internal surface of the pipe is traversed; the apparatus being so constructed that the measurement of the deepest pit encountered in any particular plane by the probing units is recorded by means of a suitable recording unit.

Another object is to provide an apparatus of the character described which may be combined with any suitable recording device, such as a mechanical recorder which may form a part of the movable apparatus or an electrical recorder which may be electrically connected therewith and remotely located therefrom to provide remote indications of the measurements being made.

The construction designed to carry out the invention will be hereinafter described, together with other features thereof.

The invention will be more readily understood from a reading of the following specification and by reference to the accompanying drawings forming a part thereof, wherein an example of the invention is shown and wherein.

In the drawings, the numeral 10 designates an elongate cylindrical shaft which forms the main supporting element of the apparatus. A plurality of probing units A are mounted upon the shaft 10 and are adapted to engage and ride upon the internal surface or wall of the pipe P, which is under investigation. As will be explained, the probing units A co-act with an annular disk or plate 11 which is secured to a tubular sleeve B, which sleeve is slideable longitudinally upon the shaft 10. The sleeve B has connection through a transverse pin 12 with an operating rod 13 and said rod has its opposite end connected to a piston 14, which is slideable within a cylinder 15 mounted in one end of the shaft. As the sleeve B is moved longitudinally on the shaft 10, the piston 14 undergoes a movement within its cylinder and this movement is utilized to actuate an operating shaft 16 of a suitable recording mechanism R. It is thus obvious that the detection and measurement of irregularities or depressions in the wall of the pipe bore by the probing units A are utilized to impart movement to the sleeve B and this sleeve, in turn, actuates a suitable recorder which records the detection and measurements so made. The apparatus is moved through the pipe under investigation in the direction of the arrow in Figure 1 and may be pulled through the pipe by a cable or may be caused to traverse the pipe by any suitable means.

Figure 1:
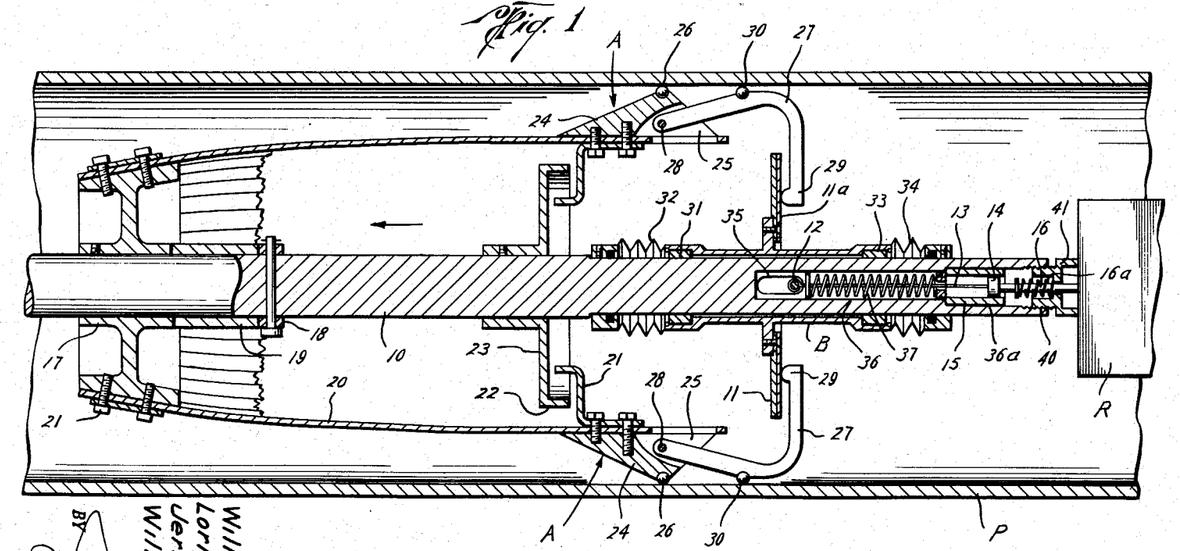
Figure 1 is a longitudinal, sectional view of a corrosion pit detector apparatus, constructed in accordance with the invention, and illustrating the same within a pipe.

Any desired number of probing units A may be employed and, of course, the number will vary in accordance with the size of the particular pipe under investigation. In practice and as an example, it has been found that twenty-four (24) probing units A will satisfactorily operate in an 8 inch pipe but, of course, more or less may be employed. The probing units A are mounted upon a hub 17, which is suitably secured to the shaft at a point spaced from the sleeve B. The hub is spaced from a thrust collar 18 by a suitable spacer sleeve 19. Each probing unit includes a spring member 20 which has one end secured by suitable bolts 21 to the hub 17 and said spring may be substantially flat with its inherent resiliency tending to urge its free end outwardly toward the wall of the pipe P. Outward movement of each spring 20 is limited by an angular stop member 21 which coacts with the flange 22 of a limiting disk or plate 23 secured to the shaft 10.

Each probing unit includes a detection element or shoe 24, which is secured to the outer end of the spring 20, and said shoe has a slot 25 formed in its outer portion. A ball contact element 26 is secured to the shoe and is adapted to engage and ride upon the wall of the bore of the pipe. It is apparent that the inherent resiliency of the spring 20 will maintain the contact element 26 in engagement with the wall of the pipe as the apparatus is moved therethrough.

Each probing unit also includes a bellcrank lever 27 which has one end pivoted at 28 within the slot 25 of the shoe 24. The opposite or free end 29 of the bellcrank lever 27 engages one surface 11-A of the annular disk or plate 11, which is secured to the movable sleeve B. A contact element or ball 30 which is constructed of wear resistant material is secured in the outer edge portion of the bellcrank lever 27 and said ball is adapted to engage and ride upon the wall of the pipe.

Figures 2, 3, 6:
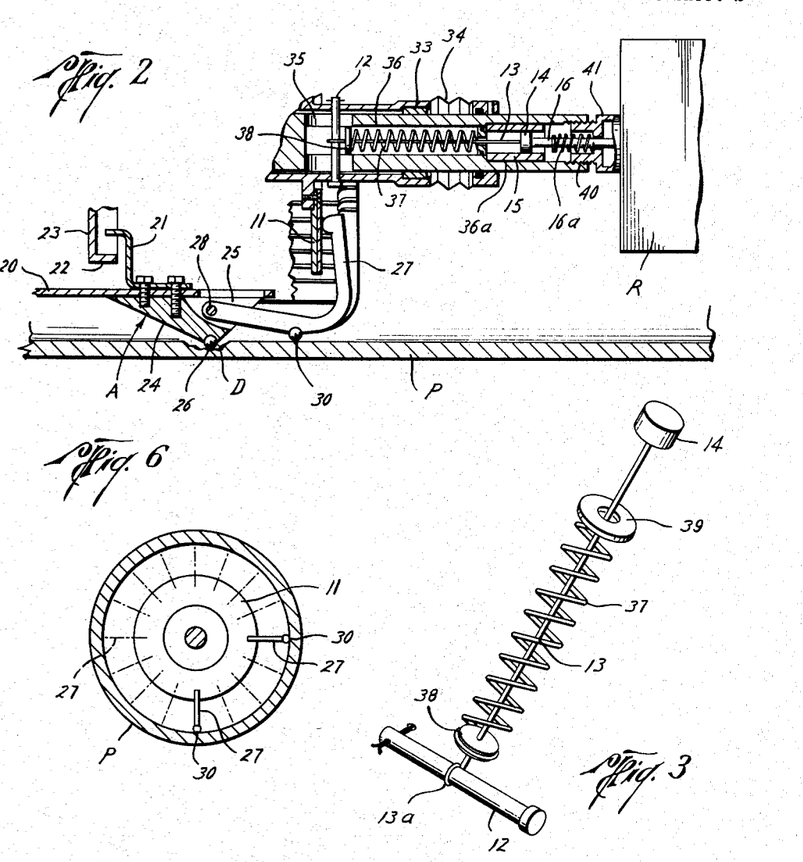
Figure 2 is a sectional view of one of the probing units and showing the position of the parts when a pit is encountered.
Figure 3 is an isometric view of the piston and rod which are actuated by the probing units.
Figure 6 is a cross-sectional view illustrating the apparatus positioned in a pipe of circular cross-section.

As will be explained, the plate or disk 11 is maintained in contact with the free ends of the bellcrank levers 27 of the probing units A and thus the parts will be retained in the position shown in Figure 1 as the apparatus moves through a pipe having a smooth internal surface. When the detection element or shoe 24 moves opposite a depression or pit D, as indicated in Figure 2, the contact element or ball 26 thereof will move into said depression or pit. This will cause the pivot point 28 of the bellcrank lever to move outwardly toward the wall of the pipe and such movement of the pivot pin 28 of the particular bellcrank lever 27 will cause a swinging of the bellcrank lever about the ball 30 which acts as a fulcrum, whereby its end 29 will impart a movement to the annular plate or disk 11; such movement of said plate or disk will result in a sliding movement of the sleeve B on the shaft 10.

It is apparent that when the contact ball 26 of the shoe or detection element 24 engages within the recess to effect the movement of the pivot pin 28, the bellcrank lever 27 is swung or fulcrumed about the contact ball or member 30, this ball remaining in engagement with the inner surface of the pipe P. The bellcrank lever is so constructed that the movement of its free end 29 is representative of the depth of the depression or pit D. Since the contact ball 30 remains in engagement with the wall of the pipe, the ball 30 may be considered a reference element, and when the relative position of this ball is changed with respect to the position of the contact ball 26 of the shoe 24, the presence of a depression or irregularity of the surface of the pipe is indicated. The amount of movement of one contact ball 26 with respect to the other 30 is a measure of the depth of the pit or depression and by properly forming the bellcrank lever 27, the free end 29 of said lever will impart a movement to the annular disk 11 and the sleeve B, which is actually a measure of the depth of said pit or depression which is encountered. It is obvious that since the reference element 30 is engaged with the wall surface of the pipe, the measurement is taken from this wall surface so that actually the movement of the sleeve B represents the depth of the particular depression which is encountered by the detection element 26. The shoe 24, by its contact element 26, is maintained in constant engagement with the wall surface and due to the connection of the bellcrank lever to the shoe, the contact element 30 is also in constant engagement with the wall of the pipe. Since the device is moving in the direction of the arrow in Figure 1, the detection element 26 will first encounter the pit or depression while the reference element 30 remains in engagement with the pipe wall. Thus, an accurate measurement of pit depth is made by utilizing the wall of the bore of the pipe as the reference point from which the measurement is taken and centering of the device within the pipe is not essential to an accurate measurement.

The mounting of the sleeve B, which undergoes movement by reason of the bellcrank lever 27 engaging and moving the annular disk or plate is clearly illustrated in Figure 1. One end of the sleeve is provided with suitable bearings 31 and the end of said sleeve is sealed by a flexible seal retainer 32. The opposite end of the sleeve is mounted on a bearing collar 33 and this end of said sleeve is sealed by a flexible seal retainer 34. Diametrically opposed slots 35 are formed in the shaft 10 on opposite sides of an axial bore 36. The transversely extending pin 12 is movable within the slots 35 and has its ends suitably connected in the sleeve B; with this arrangement it is evident that any movement of the sleeve longitudinally on the shaft will result in a movement of the pin 12 with respect to said shaft.

The transverse pin 12 and its associated parts are clearly shown in Figure 3. The elongate operating rod 13 which has the piston 14 at one end thereof has its opposite end secured to at 13-A to the transverse pin. A spring 37, which is under tension, has one end secured to a washer 38 on the rod and its opposite end secured to a collar 39 which is mounted in the end of the bore 36. The tension on the spring 37 constantly urges the pin 12 and its connected sleeve B in a direction to the right in Figure 1, whereby the annular disk or plate 11 is maintained in contact with the free ends 29 of the overlying bellcrank levers 27. This spring not only maintains the disk or plate 11 in contact with the bellcrank levers, but also maintains the contact elements 30 of said levers in engagement with the inner surface of the pipe P.

The operating rod 13, which is connected to the transverse pin 12 of the sleeve B, has the piston 14 secured to its opposite end and said piston is slideable within the cylinder 15 which is mounted in a counter bore 36-A formed in the end of the main shaft 10. This counter bore has its outer end threaded as indicated at 40 whereby a connection 41 of the recorder R may be attached thereto. As has been explained, movement of the piston 14 within its cylinder will impart a movement to the operating shaft 16 of the recorder mechanism and a suitable spring 16-A maintains the operating shaft 16 in engagement with said piston.

In the operation of the apparatus, said apparatus is inserted into the pipe P and is moved therethrough by any suitable means. The probing units A, which are mounted on the main shaft 10, are maintained in engagement with the internal wall of the bore of the pipe by the inherent resiliency of the springs 20 which carry the shoes 24 or detection elements of the unit. The bellcrank levers 27 which form a part of the probing units have their contact elements 30 maintained in engagement with the wall of the pipe by the action of the tension spring 37 which is urging the annular plate or disk 11 into firm contact with the free ends 29 of said levers. Thus, as the device is moved through the bore of the pipe, the contact ball 26 of the detection shoe or element rides on the surface of the pipe and at the same time, the contact ball 30 of the bellcrank levers 27 also engages the internal surface of said pipe. So long as the wall of the pipe is smooth, the contact balls or members 26 and 30 remain in substantially the same plane with respect to each other and the parts remain in the position shown in Figure 1. The recording mechanism R is, of course, connected to the end of the main shaft 10 in the manner illustrated.

When the contact ball or member 26 of one of the shoes 24 of a probing unit A encounters a pit or depression D in the internal surface of the pipe, said ball drops into said pit or depression, being urged into said pit by the action of its spring arm 20. When this occurs, there is a change in the relative positions of the contact member 26 with respect to the contact member 30 on the bell crank lever of that unit so that these contact members are displaced from each other since they are no longer in the same plane. The movement of the contact member carried by the shoe 24 into the pit or depression results in movement of the pivot pin 28 by which the bellcrank lever 27 is pivoted to the shoe and such movement imparts a swinging to the free end 29 of the bellcrank lever. This swinging movement is permitted because the bellcrank lever will fulcrum or swing about the point of contact between the ball or member 30 and the wall of the pipe. As has been explained, the amount of movement of the free end 29 of the bellcrank lever is representative of the depth of the pit or depression which has been encountered by the ball or contact member 26 and this movement is transmitted through the annular disk or plate to the sleeve B. Because of the connection between the sleeve B and the piston 14 such connection being through the transverse pin 12 and operating rod 13, a predetermined movement is imparted to the piston. The piston 14 has engagement with the operating shaft 16 of the recorder and functions to operate said recorder to record the measurement made by the change in position of the contact members 26 and 30 with respect to each other.

As the apparatus continues to move through the pipe, the contact ball or member 26 of the shoe 24 rides out of the pit or depression and then engages the inner wall of the pipe. Of course, the contact ball of member 30 of the bellcrank lever will then move into the pit or depression but such movement will only result in the free end 29 of the bellcrank lever swinging outwardly away from the disk or plate 11 and there will be no operation or movement imparted to the sleeve by reason of the contact ball 30 entering a pit or depression. It is evident that the movement of the apparatus continues through the pipe and as it does so, the detection element or shoe of the probing units will function to detect and measure the depth of the pits or depressions which are encountered. By providing a recording mechanism which is related to distance, it is obvious that a record may be made which will not only detect and measure each pit but which will also give the position of the particular pit or depression with respect to the length or distance along the pipe under investigation.

It is noted that the measurement of the pit depth is made by utilizing the internal wall surface of the pipe as the reference point. Each bellcrank lever which rides on the internal surface of the pipe becomes a reference element, while the shoe 24 is in fact a detection element. As the detection element drops into the pit, its position is changed with respect to the reference element and it is this displacement of one element with respect to the other which provides the information as to pit depth. Since each probing unit operates separately and independently of the others, it is obvious that the pit of greatest depth will be measured because the bellcrank lever which is associated with the shoe engaged in the deepest pit will be the bellcrank lever which will impart the greatest movement to the annular disk or plate 11. In this manner, the deepest pit encountered by any one of the probing units at any given time will be recorded by the recording mechanism. There is no necessity for the device to be accurately centered within the pipe because measurements are not made with the axis of the pipe as the reference point, said measurement being made from the wall surface of said pipe which provides the controlling reference point.

Figure 4:
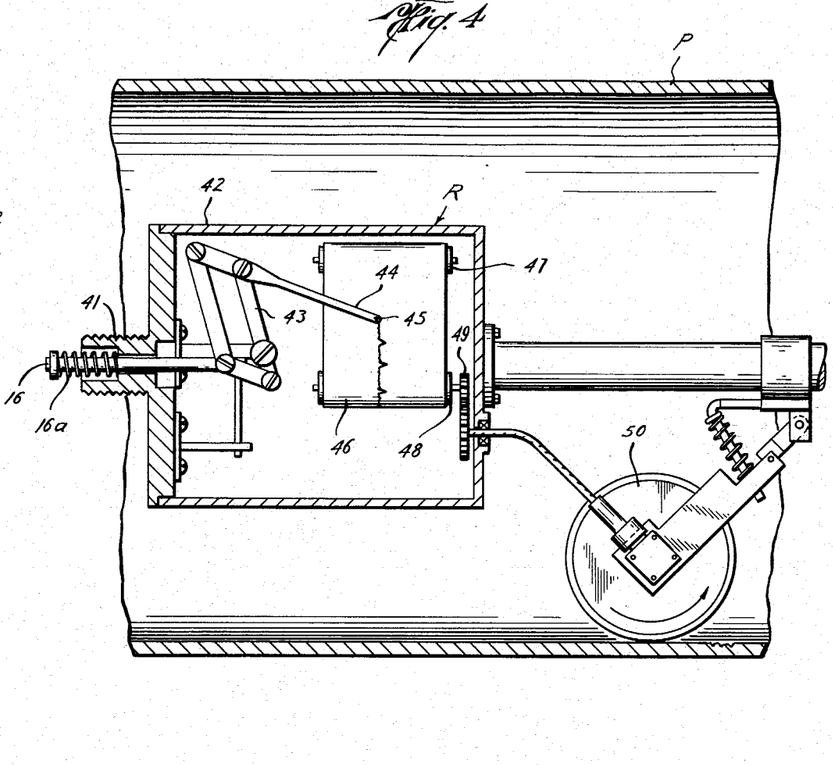
Figure 4 is a view, partly in elevation and partly in section, of one type of recorder mechanism which may be employed with the apparatus.

Any suitable type of recording mechanism may be employed and operated by the movable piston 14. One type of mechanical recorder which has been found to be satisfactory is illustrated in Figure 4 wherein the recorder R is housed within a suitable casing 42. The operating shaft 16 extends outwardly from the end of the housing and the connection 41 is adapted to be attached with the end of the shaft 10. The operating shaft 16 of the recording mechanism is connected through a mechanical linkage 43 with a stylus 44 having a marking pen 45, which is adapted to mark a chart 46. The chart 46 is wound upon a supply roller 47 and has one end engaged over a driving roller 48. The roller 48 is driven through suitable gearing 49 by a friction wheel 50 which has its lower end adapted to ride upon the internal surface of the pipe under investigation. The gearing is so arranged and the wheel 50 is of such diameter that the movement of the chart 46 is representative of the distance moved along the pipe P.

It is evident that as the apparatus is moved through the pipe, the recording chart 46 is driven at a rate relative to the rate of movement of the apparatus through the pipe and the stylus 44 is actuated in accordance with the deepest pits encountered by the probing units A. Not only do the probing units A record the position and depth of various pits but they also record other irregularities which may be present along the internal surface of the pipe.

Figure 5:
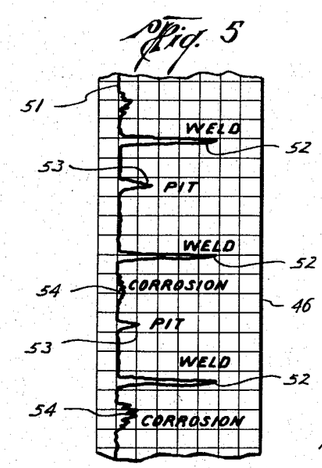
Figure 5 is an enlarged view of the recording chart.

The record made by the stylus as the apparatus moves through the pipe P is illustrated in Figure 5 and by observing this figure, it will be seen that the welds between pipe sections are evident. Referring to Figure 5, the base line which indicates the internal surface of the pipe bore is shown at 51. The offsets 52, which are all of substantially the same size indicate welds in the bore. The depressions or pits D are indicated by the offsets 53. The record also includes the irregular lines 54 which are indicative that corrosion is present in the bore of the pipe. Although the particular mechanical recorder which is illustrated in Figure 4 has been found satisfactory, any suitable type of recording mechanism may be employed. As a matter of fact, it would be possible to connect an electrical type recorder with the operating shaft 16. The invention resides primarily in the apparatus for detecting and measuring the irregularities, pits and depressions in the internal surface of the pipe and can be combined with any recording mechanism, either one directly connected with the apparatus as in Figure 1 or remotely located therefrom as would be the case if an electrical recorder was employed.

Figure 7:
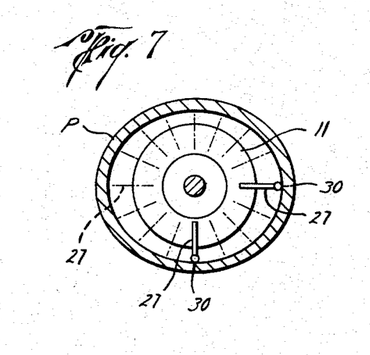
Figure 7 is a similar view of the apparatus in a pipe which is out of round.

By employing an apparatus as above described wherein the internal surface of the pipe functions as the reference point, the apparatus is not sensitive to a pipe which is not of constant diameter or to a pipe which may be out of round. As is well known, most pipe lines are formed of relatively large steel pipe and it is not at all unusual for said pipe to be out of round. Observing Figures 6 and 7, it will be evident that the deepest pit encountered at any time by any of the probing units will be accurately recorded regardless of the particular cross sectional shape of the pipe. As shown in Figure 6, the pipe is circular in cross section and in such case, each probing unit functions as an independent means for recording the pits or depressions encountered by that particular unit. Each measurement is made by using the wall of the pipe as the reference point from which the depth is measured and, as has been explained, the particular probing unit encountering the deepest pit will be the particular unit which actuates the recorder to move the stylus to its farthest point transversely of the recording chart. If the pipe is out of round or generally elliptical in shape as shown in Figure 7, the probing units will operate in identically the same manner because as in the case where a circular pipe is under investigation, each probing unit is an independent means for measuring the pits encountered utilizing the wall of the pipe as the reference point from which measurements are taken. Thus, the present apparatus need not be centered with respect to the pipe because each probing unit operates independently while utilizing the wall of the pipe as the point from which the depth measurement is taken.

Figure 8:
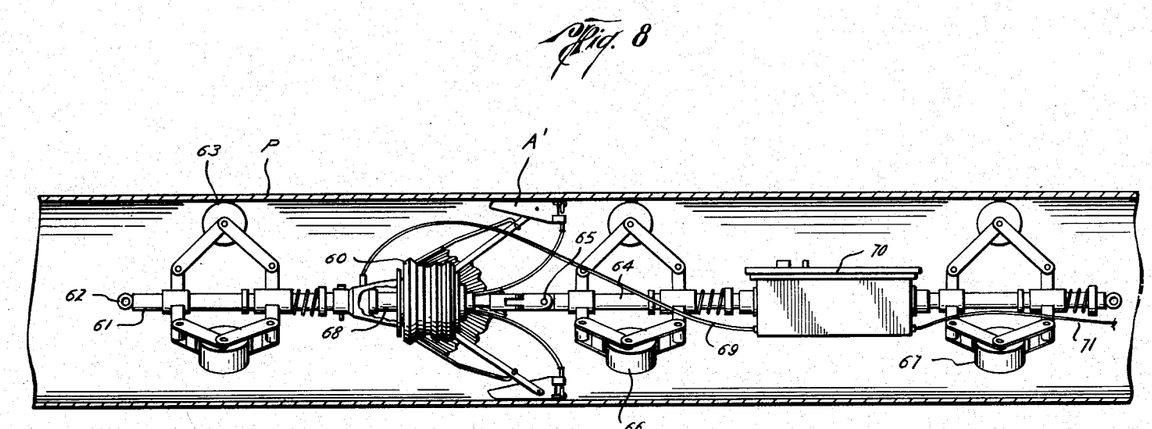
Figure 8 is a longitudinal, sectional view of a modified form of the invention.
Figures 9, 11:
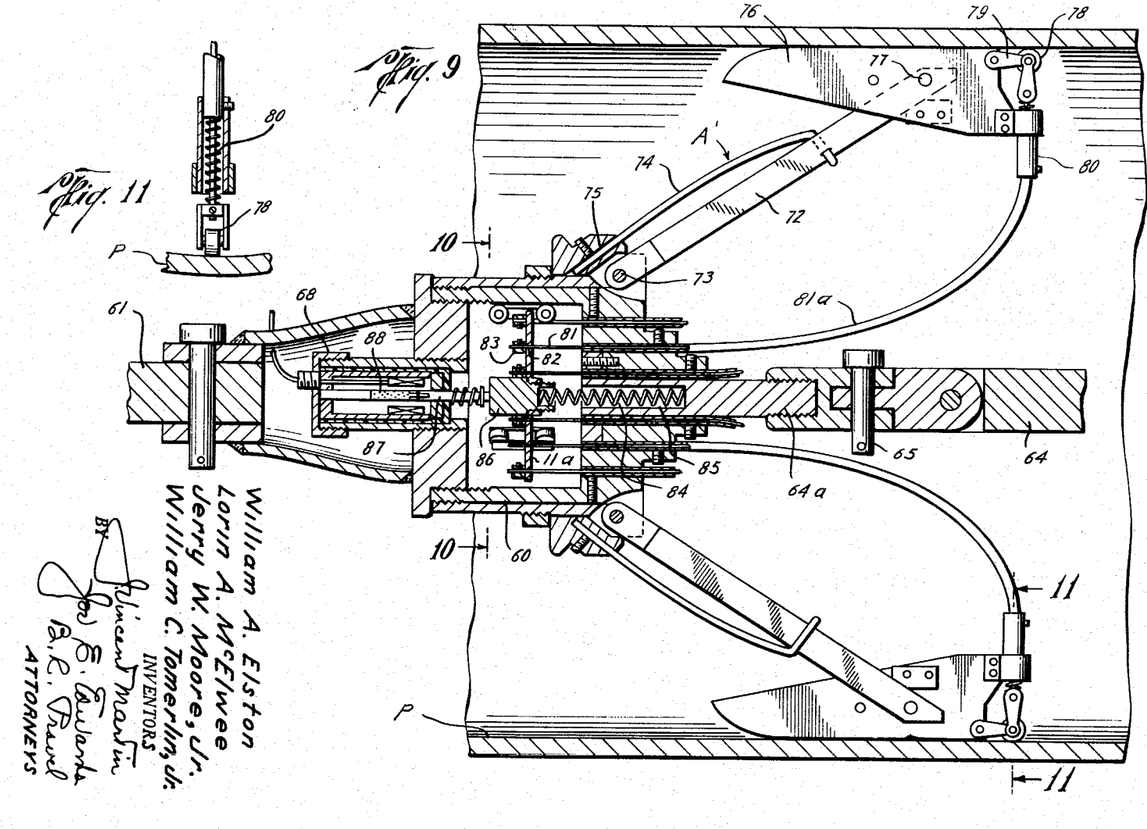
Figure 9 is an enlarged view, partly in section and partly in elevation of the probing units of this modified form.
Figure 11 is an end elevation of the detector roller of one of the probing units.
Figure 10:
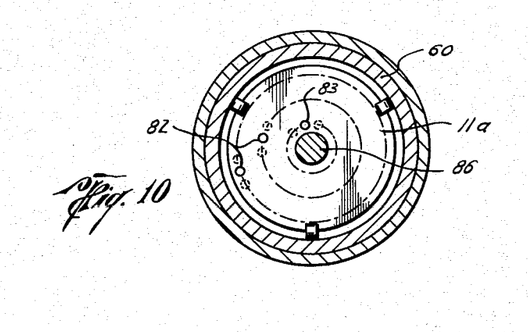
Figure 10 is a transverse sectional view, taken on the line 10—10 of Figure 9.

The form of apparatus illustrated in Figures 1 to 7 is extremely simple in construction and is accurate and efficient in its operation. However, the invention may be carried out by varying the construction of the apparatus while still utilizing the basic principle of employing the wall of the bore of the pipe as the point from which measurements are made. In Figures 8 to 11, a modified form of the invention is shown. In this form, a central housing 60 is suitably secured to a shaft 61, which is provided with a loop 62 at its forward end whereby the housing may be moved through the pipe P by means of a cable or line. Supporting rollers 63 are mounted on the shaft to facilitate movement of the apparatus through the pipe. The housing 60 has a plurality of probing units A' mounted thereon and a trailing shaft 64 is coupled to the housing through a suitable connecting joint 65. Additional rollers 66 and 67 support the rear portion of the unit and facilitate its movement through the pipe. The form illustrated in Figures 8 to 10 illustrates an electrically operated recorder which includes a transducer 68 which is actuated by the probing units. The transducer has connection through an electrical cable 69 with an oscillator 70 which is mounted on the trailing shaft 64. The oscillator circuit which is located in the casing indicated at 70 includes a suitable line amplifier and associated filters and the transducer 68 forms part of the overall circuit. A trailing cable 71 extends from the rear portion of the unit and is connected to the input of a suitably designed frequency sensitive interpreter unit which is arranged to produce a D.C. output which can be connected to any of several of the well known types of commercially available recorders. Obviously, as the apparatus moves through the pipe P, the recording can be made at a remote point since it is electrically actuated.

The construction of the probing units A' of this form of the invention is clearly shown in Figure 9. The housing 60 has each probing unit A' secured thereto and each unit includes an arm 72 which is pivoted at 73 to the housing 60; a spring 74 having one end confined within a block 75 has its opposite end engaged with the arm 72 and constantly exerts its pressure to urge the arm outwardly toward the wall of the pipe. An elongate shoe or sled 76 is pivotally mounted at 77 to the outer end of each arm 72 and said sled or shoe is adapted to ride upon the wall of the pipe. The shoe or sled 76 constitutes a reference element which would be similar in its action to the reference element or bellcrank lever 27 of the first form of the invention.

Mounted upon the trailing end of each shoe or sled 76 is a detection element in the form of a roller 78 which is mounted on the outer end of a pivoted arm 79. It will be evident that as each probing unit moves along the internal surface of the pipe the shoe or sled 76 being elongate, will span the pits or depressions and will remain in substantially the same plane as the wall of the bore. A coil spring 80 constantly urges the roller 78 outwardly into contact with the wall of the bore and as the roller 78 encounters a pit or depression, it will move downwardly into such pit or depression so that in effect the roller is swung or moved on its pivoted arm 79 with respect to the shoe or sled 76 upon which it is mounted. As the roller moves downwardly into a pit or depression, it imparts a sliding movement to an annular disk or plate 11-A, being connected to said disk by means of a cable 81. Each cable may be housed in a suitable sheath 81-A.

As is clearly shown in Figure 9, the cable 81 extends through an opening 82 in the disk or plate 11-A and a suitable collar or enlargement 83 is secured to the outer projecting end of the cable. With this arrangement, movement of the roller 78 in a direction radially outwardly of the center of the pipe will cause the cable to exert a pull upon the annular disk or plate 11-A and will cause said plate to be moved in a direction to the right in Figure 9 against the force of a spring 84, which is disposed within the bore 85 of a connecting shaft 64-A. The shaft 64-A connects the housing 60 with the trailing shaft 64 through the connection 65.

The annular plate or disk 11-A is connected to a central block 86 against which the spring 84 acts and an operating rod 87 extends from said block. This operating rod 87 has connection with the core 88 of the electrical transducer 68 and thus the movement of the plate or disk 11-A as caused by the cable 81 connected with the roller 78 results in actuating the oscillator circuit, which, in turn, actuates the electrical recorder which is disposed at a remote location.

The operation of the form shown in Figures 8 to 11 is substantially the same as that of the first form heretofore described. As the apparatus is moved through the pipe P, the probing units A' are maintained in contact with the internal surface of the pipe by the springs 74, which act upon the arms 72 to which the shoes 76 are connected; the roller 78 is constantly urged into contact with the wall of the bore by the spring 80 and it is noted that said spring 80 maintains a constant pull against the annular plate or disk 11-A. It is noted that the spring 80 is of greater strength than the spring 84, which is urging the plate 11-A in a direction opposite to that caused by the spring 80. When the roller 78 encounters a pit or depression, the spring 80 urges the same into such pit or depression and results in the cable 81 applying a pulling force to the plate or disk 11-A, such movement being in a direction to the right in Figure 9. As the plate or disk 11-A is moved, it actuates the electrical transducer and the electrical indication is in accordance with the amount of movement of said disk or plate. It is, of course, apparent that the travel of the plate or disk 11-A is in accordance with the depth of the pit or depression encountered by the roller 78 and thus the movement of the plate or disk is a measure of the pit depth. Since the shoe or sled 76 is in constant engagement with the internal surface of the bore of the pipe, this element provides a reference point from which the depth measurement is taken. The amount of displacement or misalignment of the roller 78 with the surface of the sled or shoe is a measure of the depth of the pit. As in the first form of the invention, the pipe wall is employed as the reference point and the measurement made by each probe unit is made with respect to this particular reference point. Also, each probing unit operates independently of all of the other probing units and the roller which is disposed the greatest distance outward from its particular associated shoe or sled will be the roller which imparts the maximum movement to the annular disk or plate 11-A. Therefore, as in the first form of the invention, the deepest pit encountered at any given time is the pit which is measured and the depth of which is recorded on the recording mechanism.

In both forms of the invention, it is unnecessary for the device to be accurately centered because no measurement of the radius or of the diameter of the pipe is made. The only measurement which is made is the depth of the pit encountered by each probing unit and the recording mechanism is actuated by that probing unit which has engaged the deepest pit. Although an electrical mechanism has been illustrated in connection with the second form of the invention, it is apparent that a mechanical recorder of the type shown in Figure 4 could be combined with this form of the invention; in such case, the operating shaft 87 would be connected with the operating shaft 16 of the recording mechanism. Similarly, the electrical recorder generally illustrated in the form shown in Figures 8 to 11 may be employed with the particular detection and reference elements shown in Figures 1 to 7. Since the apparatus does not depend upon a measurement of the radius of the pipe, an accurate measurement of the deepest pit encountered at any given time is accurately produced and the device is particularly applicable for taking measurements and detecting pits in the large diameter pipes which are disposed in a horizontal plane. Because centering of the device within the pipe is unnecessary, accurate measurements in pipes which are out of round and which are of cross sectional shapes other than circular may be made.

The invention has been described as particularly adaptable for use in detecting pits or corrosion in metallic pipes, but it is evident that the same may be employed for detecting irregularities in any surface. Although the invention provides means not only for detecting the presence of an irregularity in a surface, but also for measuring the extent of such irregularity, it is obvious that it can be utilized for merely detecting the presence of such irregularity without the actual measurement of the extent thereof. In other words, if the movement of the detection element is not related to the movement of the annular disk 11 in the first form or the disk 11-A of the second form, then the device would merely detect and indicate the presence of a pit or irregularity without indicating the depth or extent thereof; in some instances it may be necessary only to detect the presence of the irregularity.

The foregoing disclosure and description of the invention is illustrative and explanatory thereof, and various changes in the size, shape and materials, as well as in the details of the illustrated construction may be made, within the scope of the appended claims, without departing from the spirit of the invention.

What we claim is:

1. An apparatus for detecting irregularities in a surface including, a reference element adapted to be moved over the surface under investigation, resilient means for maintaining the reference element in contact with said surface, a detection element carried by and movably connected with the reference element, and means for constantly urging said detection element into engagement with said surface at a point spaced from the area of contact between the reference element and said surface, whereby, when said detection element engages an irregularity in the surface, the detection element undergoes movement with respect to the reference element, such movement of the detection element being indicative of the presence of such irregularity.

2. An apparatus for detecting irregularities in a surface including, a reference element adapted to be moved over the surface under investigation, resilient means for maintaining the reference element in contact with said surface, a detection element carried by and movably connected with the reference element and having engagement with said surface at a point spaced from the area of contact between the reference element and said surface, means for constantly urging the detection element into contact with said surface, and means for measuring the relative amount of movement of the detection element with respect to the reference element to indicate the extent of the irregularity encountered by the detection element.

3. An apparatus as set forth in claim 1, together with means for recording the movement of the detection element with respect to the reference element to record the presence of said irregularity.

4. An apparatus as set forth in claim 2, together with means for visually recording the measurement made of the relative amount of movement of the detection element with respect to the reference element.

5. An apparatus for detecting irregularities in a surface including, a support, a probing unit mounted on said support and adapted to be resiliently maintained in engagement with the surface under investigation, said probing unit comprising a reference element which engages and rides upon said surface and a detection element carried by and capable of independent movement relative to the reference element and engaging the surface under investigation at a point spaced from the area of engagement of the reference element with said surface, whereby said detection element may undergo movement with respect to the reference element upon engaging an irregularity in the surface under investigation, said movement of the detection element being indicative of the presence of said irregularity.

6. An apparatus for detecting irregularities in a surface as set forth in claim 5, together with means associated with and actuated by the probing unit for indicating the amount of movement of the detection element with respect to the reference element to thereby indicate the presence and the extent of the irregularity encountered by said detection element.

7. An apparatus for detecting irregularities in a surface as set forth in claim 5, together with means associated with and actuated by the probing unit for indicating the movement of the detection element with respect to the reference element, and recording means actuated by said indicating means for recording said movement of the detection element.

8. An apparatus for detecting irregularities in a surface as set forth in claim 5, together with means associated with and actuated by the probing unit for indicating the amount of movement of the detection element with respect to the reference element to thereby indicate the presence and the extent of the irregularity encountered by said detection element, and recording means actuated by said indicating means for recording the movement as well as the amount thereof of said detecting element.

9. An apparatus for detecting irregularities in the internal surface of a tubular member including, a support, a plurality of probing units mounted on said support and adapted to be maintained in engagement with the wall of said tubular member as the support is moved therethrough, each probing unit including a reference element which rides upon the internal wall of the tubular member and a detection element capable of independent movement with respect to the reference element, said detection element engaging the surface under investigation at a point spaced from the area of contact between its reference element and said surface whereby when the detection element contacts an irregularity in the wall surface said detection element undergoes movement relative to the reference element to indicate the presence of said irregularity, and means for recording the movement of the detection element with respect to the reference element.

10. An apparatus for detecting irregularities in the internal surface of a tubular member including, a support, a plurality of probing units mounted on said support and adapted to be maintained in engagement with the wall of said tubular member as the support is moved therethrough, each probing unit including a reference element which rides upon the internal wall of the tubular member and a detection element capable of independent movement with respect to the reference element, said detection element engaging the surface under investigation at a point spaced from the area of contact between its reference element and said surface whereby when the detection element contacts an irregularity in the wall surface said detection element undergoes movement relative to the reference element to indicate the presence of said irregularity, and means for recording the movement of the detection element and also for recording the extent of said movement with respect to the reference element to record the extent of the irregularity encountered by the detection element.

11. An apparatus for detecting irregularities in the internal surface of a tubular member including, a support, a plurality of probing units mounted on said support and adapted to be maintained in engagement with the wall of said tubular member as the support is moved therethrough, each probing unit including a reference element which rides upon the internal wall of the tubular member and a detection element capable of independent movement with respect to the reference element and engaging the internal wall, whereby when the detection element contacts an irregularity in the wall surface said detection element undergoes movement relative to the reference element to indicate the presence of said irregularity, and a single movable means mounted on the support and actuated by the movement of any one of the detection elements of the probing units for indicating the extent of movement of said detection elements, the maximum movement of said indicating means being effected by the particular probing unit whose detection element has undergone the greatest movement with respect to its reference element, whereby the indicating means indicates the irregularity of maximum extent encountered by the probing units at any given instant.

12. An apparatus as set forth in claim 11, together with a recorder for recording the movement of the indicating means.

13. An apparatus as set forth in claim 11, together with a mechanical recorder mounted on the support and connected with the indicating means for recording the movement of the indicating means.

14. An apparatus as set forth in claim 11, together with an electrical oscillator circuit actuated by the movement of the indicating means, and an electrically actuated recorder actuated by said oscillator circuit and remote from the support, probing units and indicating means for recording the movement of the indicating means.

15. An apparatus for detecting pits within the internal surface of a pipe including, a support movable through the pipe under investigation, a plurality of probing units mounted on the support and adapted to traverse the internal wall of said pipe, each probing unit including a movable arm having one end attached to the support and its opposite free end urged outwardly into contact with the internal surface of the pipe, a detection element mounted on the free end of said arm, a reference element in the form of a bell crank lever having one end pivoted to the detection element and having its free end projecting inwardly toward the support, each lever having a contacting part on its outer edge portion engaging the internal surface of the pipe, an annular indicating plate member slidably mounted on the support and disposed adjacent to the inner free ends of the bell crank levers whereby said levers overlie said plate member, spring means for urging the plate member into constant engagement with the free ends of the bell crank levers whereby the contacting parts of the outer edge portions of the bell crank levers are maintained in engagement with the internal surface of the pipe under investigation, movement of the detection element relative to its bell crank lever by reason of said detection element engaging a depression in the wall surface resulting in a change in position of said detection element relative to the bell crank to swing the bell crank lever and cause said lever to impart a movement to said indicating plate member which movement is representative of the extent of movement of said detection element with respect to the bell crank lever.

16. An apparatus as set forth in claim 15, together with a recorder actuated by the movement of said indicating plate member to record the indications thereof.

17. An apparatus for detecting pits within the internal surface of a pipe including, a support movable through the pipe under investigation, a plurality of probing units mounted on the support and adapted to traverse the internal wall of said pipe, each probing unit including a pivoted arm having a shoe member at its outer end adapted to ride upon and engage the wall of the pipe under investigation, said shoe member forming a reference element, each probing unit also including a detecting element pivotally mounted on the shoe member and capable of independent movement relative thereto, spring means for constantly urging the detecting element of each probing unit outwardly into contact with the wall surface of the pipe, whereby, when said detecting element encounters a pit within said surface, the detecting element undergoes movement relative to its respective shoe member, a movable indicating element on said support, and means connecting each detecting element with said indicating element, whereby movement of the detecting element imparts movement to the indicating means to indicate the extent of movement of said detecting element with respect to the shoe member on which it is mounted.

18. An apparatus as set forth in claim 17, together with a recorder actuated by the movement of the indicating means to record the movement of said means.

19. An apparatus for detecting irregularities in a surface including, a first element adapted to be moved over the surface under investigation and having engagement with said surface at a single point of contact, a second element movably mounted on said first element and connected therewith, said second element engaging the surface under investigation at a point spaced from the point of contact between the first element and said surface, and resilient means associated with each element for maintaining the elements in engagement with the surface, whereby the engagement of the contact area of one of said elements with an irregularity in the surface causes relative movement between the two elements with respect to each other, the amount of such relative movement being a measure of the extent of the irregularity which has been encountered.

20. An apparatus as set forth in claim 19, together with means for recording the relative movement of the two elements to record the presence and extent of said irregularity.

21. An apparatus for detecting irregularities in the internal surface of a tubular member including, a support, a plurality of probing units mounted on said support and engaging the wall of the tubular member as the support is moved therethrough, each probing unit including a first element and a second element movably mounted upon and connected with said first element, said first element engaging the wall with a point contact and the second element contacting the wall at a point spaced from the point of contact between the first element and the wall, each probing unit also including means for urging each of the elements into engagement with the wall to maintain contact therewith, whereby the engagement of the contact area of one of said elements with an irregularity in the wall surface causes a relative movement between the two elements with respect to each other, the amount of said relative movement being a measure of the extent of the irregularity which has been encountered.

22. An apparatus as set forth in claim 21, together with a recording means actuated by the relative movement between the elements to indicate the presence and extent of the irregularity which has been encountered.

References Cited in the file of this patent

UNITED STATES PATENTS

| | | |
|---|---|---|
| 490,860 | Snoeck | Jan. 31, 1893 |
| 2,011,931 | Dreyer | Aug. 20, 1935 |
| 2,239,811 | Cuppers | Apr. 29, 1941 |
| 2,344,216 | Raydon | Mar. 14, 1944 |
| 2,398,562 | Russell | Apr. 16, 1946 |
| 2,459,499 | Castel | Jan. 18, 1949 |
| 2,518,663 | Channey et al. | Aug. 15, 1950 |
| 2,631,378 | Wynne | Mar. 17, 1953 |
| 2,662,297 | Reicherter | Dec. 15, 1953 |
| 2,795,855 | Worthen | June 18, 1957 |